(12) United States Patent
Wickboldt (10) Patent No.: US 11,620,852 B2
(45) Date of Patent: Apr. 4, 2023

(54) METHOD FOR DETECTING SPOOF FINGERPRINTS WITH AN UNDER-DISPLAY FINGERPRINT SENSOR

(71) Applicant: OmniVision Technologies, Inc., Santa Clara, CA (US)

(72) Inventor: Paul Wickboldt, Walnut Creek, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/469,473

(22) Filed: Sep. 8, 2021

(65) Prior Publication Data

US 2023/0071596 A1 Mar. 9, 2023

(51) Int. Cl.
| | |
|---|---|
| *G06V 40/12* | (2022.01) |
| *G06F 3/041* | (2006.01) |
| *G06F 3/042* | (2006.01) |
| *G06V 10/24* | (2022.01) |
| *G06V 40/13* | (2022.01) |

(52) U.S. Cl.
CPC ........ *G06V 40/1388* (2022.01); *G06F 3/0416* (2013.01); *G06F 3/0425* (2013.01); *G06V 10/24* (2022.01); *G06V 40/1318* (2022.01)

(58) Field of Classification Search
CPC ............... G06V 40/1388; G06V 10/24; G06V 40/1318; G06F 3/0416; G06F 3/0425
See application file for complete search history.

(56) References Cited

U.S. PATENT DOCUMENTS

| | | |
|---|---|---|
| 10,102,411 B2 | 10/2018 | Lillie et al. |
| 10,438,046 B2 | 10/2019 | He et al. |
| 11,018,173 B2 | 5/2021 | Kim |
| 11,039,056 B2 | 6/2021 | Kang |
| 11,056,519 B2 | 7/2021 | Inui |
| 11,056,523 B2 | 7/2021 | Park |
| 11,074,467 B2 | 7/2021 | He |
| 11,217,617 B2 | 1/2022 | Akiyama |
| 11,297,271 B2 | 4/2022 | Wakashima |
| 11,328,150 B2 | 5/2022 | Fan |
| 11,348,376 B2 | 5/2022 | Park |
| 11,372,248 B2 | 6/2022 | Calafiore |
| 11,404,455 B2 | 8/2022 | Nakata |

(Continued)

OTHER PUBLICATIONS

U.S. Appl. No. 17/469,461, filed Sep. 8, 2021, Paul Wickboldt.

(Continued)

*Primary Examiner* — Premal R Patel
(74) *Attorney, Agent, or Firm* — Cozen O'Connor (57) ABSTRACT

A method for detecting spoof fingerprints with an under-display fingerprint sensor includes illuminating, with incident light emitted from a display, a target region of a fingerprint sample disposed on a top surface of the display; detecting a first scattered signal from the fingerprint sample with a first image sensor region of an image sensor located beneath the display, the first image sensor region not directly beneath the target region, the first scattered signal including a first portion of the incident light scattered by the target region; determining a scattered light distribution based at least in part on the first scattered signal; and identifying spoof fingerprints based at least in part on the scattered light distribution.

17 Claims, 9 Drawing Sheets

(56) References Cited

U.S. PATENT DOCUMENTS

| | | | |
|---|---|---|---|
| 11,410,412 B2 | 8/2022 | Yang | |
| 11,450,138 B2 | 9/2022 | Nilsson | |
| 11,455,826 B2 | 9/2022 | Zhong | |
| 11,468,705 B1 | 10/2022 | Liao | |
| 11,475,706 B2 | 10/2022 | Li | |
| 2019/0026527 A1* | 1/2019 | He | G02B 6/0026 |
| 2020/0265205 A1* | 8/2020 | Wang | G06V 10/141 |
| 2020/0285722 A1* | 9/2020 | He | G06F 21/32 |
| 2020/0394378 A1* | 12/2020 | Riehl | G06F 21/32 |
| 2021/0174105 A1* | 6/2021 | He | G06V 10/141 |
| 2021/0195127 A1 | 6/2021 | Ishiwata | |
| 2022/0181372 A1 | 6/2022 | Lee | |
| 2022/0231095 A1 | 7/2022 | Erickson | |
| 2022/0276163 A1 | 9/2022 | Cheung | |
| 2022/0277509 A1 | 9/2022 | Mundus | |
| 2022/0307967 A1 | 9/2022 | Kiselev | |

OTHER PUBLICATIONS

U.S. Appl. No. 17/469,565, filed Sep. 8, 2021, Paul Wickboldt.
U.S. Appl. No. 17/469,508, filed Sep. 8, 2021, Paul Wickboldt.
U.S. Appl. No. 17/469,565, Notice of Allowance dated Oct. 26, 2022, 11 pages.

\* cited by examiner

METHOD FOR DETECTING SPOOF FINGERPRINTS WITH AN UNDER-DISPLAY FINGERPRINT SENSOR

BACKGROUND

Fingerprint sensing is becoming an increasingly common tool for authorizing (a) access to electronic devices, such as smartphones, (b) access to confidential electronic records, and (c) electronic transactions such as financial transactions carried out over the Internet. Fingerprint sensing satisfies market demand for an authentication mechanism that eliminates the need to enter (and remember) a passcode, and also eliminates the need to keep track of multiple different passcodes associated with different devices and/or accounts. Fingerprint sensing is a well-established form a biometric identification and optical fingerprint sensors have been used for years, e.g., by law enforcement agencies.

Several different types of optical fingerprint sensors have been designed for use in smartphones and other mobile devices. Each of these types of fingerprint sensors images a finger to obtain the fingerprint. A camera-based fingerprint scanner captures an image of a fingerprint using an imaging lens and an image sensor. A collimator-based fingerprint scanner senses a fingerprint with a lens array aligned over an image sensor with the addition of a collimator above the image sensor. The collimator helps map lights scattered from a specific region of the fingerprint sample to be detected by a corresponding region of the image sensor by forming channels the light must propagate through to reach the image sensor.

One issue with fingerprint image sensing is the possibility of generating fake, or spoof, fingerprints that trick the fingerprint sensor in order to gain access to a device. Spoof fingerprints can be fabricated in a variety of ways including printing an image of the fingerprint on paper and forming molded objects that reproduce the desired fingerprint pattern. If created with sufficiently high resolution and fidelity to the real fingerprint, these spoofing methods can trick fingerprint sensors and allow unauthorized access to devices and accounts. Improving the ability of image-sensor based fingerprint sensors to distinguish real fingerprints from spoof fingerprints will increase their value as, devices.

SUMMARY OF THE INVENTION

In an embodiment, a method for detecting spoof fingerprints with an under-display optical fingerprint sensor with a controlled light source includes activating the controlled light source to illuminate a target region of a fingerprint sample, wherein the target region is a less than a total image area of the optical fingerprint sensor; acquiring an anti-spoof image using the optical fingerprint sensor while the controlled light source illuminates the target region; processing the anti-spoof image to identify a characteristic of the anti-spoof image; and processing the characteristic to determine whether the fingerprint sample is a real finger or a spoofed finger.

In a further embodiment, an optical fingerprint sensor for detecting spoof fingerprints includes an image sensor comprising a plurality of pixels for capturing a total image area; a controlled light source controllable to illuminate the total image area and a target region that is less than the total image area; a processor for controlling the image sensor to: acquire an anti-spoof image when the controlled light source illuminates the target region, process the anti-spoof image to identify a characteristic of the anti-spoof image and use the characteristic to determine whether the fingerprint sample is a real finger or a spoofed finger; and acquire an image of a fingerprint sample when the controlled light source illuminates the total image area.

DETAILED DESCRIPTION OF THE EMBODIMENTS

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the terms "below" and "under" may encompass both an orientation of above and below. The device may be otherwise oriented (rotated ninety degrees or at other orientations) and the spatially relative descriptors used herein interpreted accordingly. In addition, it will also be understood that when a layer is referred to as being "between" two layers, it may be the only layer between the two layers, or one or more intervening layers may also be present.

The term semiconductor substrate may refer to substrates formed using semiconductors such as silicon, silicon-germanium, germanium, gallium arsenide, and combinations thereof. The term semiconductor substrate may also refer to a substrate, formed of one or more semiconductors, subjected to previous process steps that form regions and/or junctions in the substrate. A semiconductor substrate may also include various features, such as doped and undoped semiconductors, epitaxial layers of silicon, and other semiconductor structures formed upon the substrate.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meanings.

Fingerprint sensors are used to control access to devices and information that is individualized and does not require memorization of passwords. Techniques exist to overcome fingerprint sensors and gain unauthorized access to devices and information including creating spoof fingerprints. Spoof fingerprints include printed images of fingerprints and molded objects that reproduce the three-dimensional structure of the target fingerprint sample. Current techniques to detect spoof fingerprints largely rely on reviewing real and spoof fingerprints and using algorithms to detect the differences in the images generated of each by the fingerprint sensor. As spoof fingerprints are made with higher resolution and fidelity, the images they produce on the fingerprint sensor become less distinguishable from images of real fingerprints. Using only the image of a fingerprint sample for spoof detection leaves fingerprint sensors vulnerable to high-quality, high-resolution spoof fingerprint attacks.

In the case of under-display optical fingerprint sensors, fingerprint samples are illuminated by light from a light-emitting layer within the display. This electromagnetic energy travels through the glass of the display and interacts with the fingerprint sample at the top surface of the glass, at the glass-sample interface, leading either to a reflection at the interface or transmission out of the glass. Upon illumination of a fingerprint sample, the electromagnetic energy incident on the surface of the finger may interact with the sample in different ways. Electromagnetic energy may reflect off the surface of the sample or it may be transmitted into the sample where it may be scattered within the material of the sample, where the physical properties of the sample will affect the scattering processes. Electromagnetic energy may be scattered and travel in a direction parallel to the glass surface, where it may be scattered again and be directed back into the glass of the display. In this case, the electromagnetic energy may reach the fingerprint sensor but from a position horizontally displaced from the location where the electromagnetic energy entered the fingerprint sample.

The extent to which light travels into the fingerprint sample, is redirected, and eventually detected is affected by the material that makes up the sample. The amount of light scattered within the sample and directed back into the glass at a different location will be different for spoof fingerprint samples than for true fingerprint samples since the material used to make the spoof fingerprint sample will interact with electromagnetic energy differently than human flesh. A fingerprint sensor capable of detecting this scattered light distribution has an ability to detect spoof fingerprints that is superior to one which only records an image of the sample. The embodiments described herein disclose a method to identify spoof fingerprints based at least in part on the extent of scattering that occurs within the fingerprint sample, which is measured by monitoring the light detected at regions not directly beneath the illuminated region of the fingerprint sample. The term "light" and the term "electromagnetic energy" are used interchangeably herein. Electromagnetic energy herein refers to electromagnetic energy with wavelength between 0.4 and 2 microns.

Figure 1:
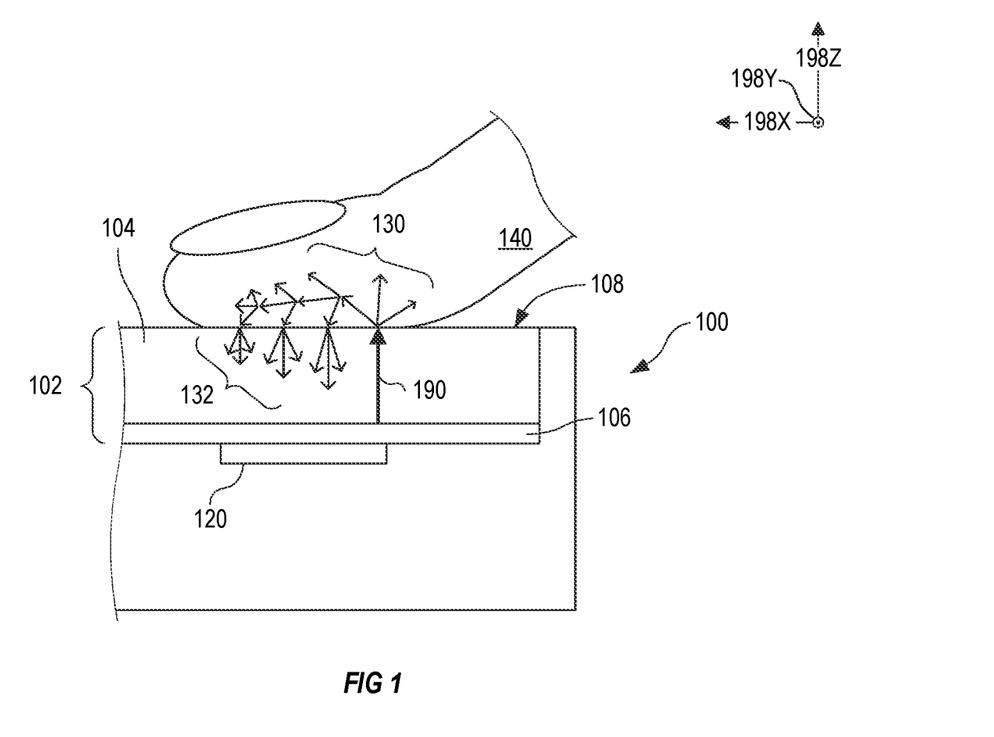
FIG. 1 illustrates the translucent properties of a human finger used with an optical fingerprint sensor, according to an embodiment.

FIG. 1 illustrates the translucent properties of a human finger used with an optical fingerprint sensor in a cross-sectional side view, according to an embodiment. The cross section illustrated in FIG. 1 is parallel to a plane, hereinafter the x-z plane, formed by orthogonal axes 198X and 198Z, which are each orthogonal to an axis 198Y. A plane, hereinafter the x-y plane, formed by orthogonal axes 198X and 198Y, and planes parallel to the x-y plane are referred to as horizontal planes. Unless otherwise specified, heights of objects herein refer to the object's extent along axis 198Z. Herein, a reference to an axis x, y, or z refers to axes 198X, 198Y, and 198Z respectively. Also, herein, a width refers to an object's extent along the x axis, a depth refers to an object's extent along the y axis, a thickness (of thinness) refers to an object's extent along the z axis, and vertical refers to a direction along the z axis. Also, herein, above refers to a relative position a distance away along the axis 198Z in the positive direction and below refers to a relative position a distance away along the axis 198Z in the negative direction.

Electronic device 100 includes a display 102 that includes a cover glass 104 and a light-emitting layer 106. Beneath the display 102 is the optical fingerprint sensor 120. In embodiments, optical fingerprint sensor 120 includes an array of pixels that capture light and process it to form an image. In embodiments, the array of pixels may also be referred to as an image sensor that forms a portion of optical fingerprint sensor 120.

In a use scenario, a fingerprint sample 140 is disposed on a top surface 108 of the display 102. Fingerprint sample 140 is illuminated by incident light 190 emitted from the display 102. As described above, when incident light 190 strikes fingerprint sample 140, some of incident light 190 becomes scattered light 130 within fingerprint sample 140. Scattered light 130 diffuses through fingerprint sample 140 and some of it exits fingerprint sample 140 into cover glass 104 as re-transmitted light 132. Scattered light 130 may also be understood as diffused light and the terms scattered and diffused may be used interchangeably herein.

Transmission of incident light 190 into fingerprint sample 140 is greatest when there is good mechanical coupling of a finger to top surface 108 and even better when there is moisture to optically couple the finger to the glass. As shown in FIG. 1, incident light 190 is illuminated at a small spot at the right side of fingerprint sample 140. The light that enters the finger is scattered by the internal tissue of the finger. This diffuse scattering can spread scattered light 130 over millimeters of distance. A small fraction of scattered light 130 is re-transmitted into the glass as re-transmitted light 132 and can be read by optical fingerprint sensor 120. Re-transmitted light 132 may vary in intensity depending on distance from the entry point of incident light 190. In embodiments, the intensity of re-transmitted light 132 will drop off as a function of distance from the point of illumination. In the invention presented here, an anti-spoof image is taken of the re-transmitted light and characteristics of the anti-spoof image are used for spoof detection. One of those characteristics may be the intensity of re-transmitted light 132 however others, such as patterns or specific scattered light distributions may also be used.

When employing algorithms to detect spoof fingerprints, the additional information provided by the extent of translation due to internal scattering and diffusion may also be inputted into the algorithms for enhanced spoof-detection accuracy. This is especially valuable with the use of machine learning algorithms, which automatically compare differences between training sets. Variations in angular distributions that are caused by material properties of the sample will be available to machine learning algorithms, which will be able to identify spoof fingerprints based on combination of image details and angular distribution.

Figure 2:
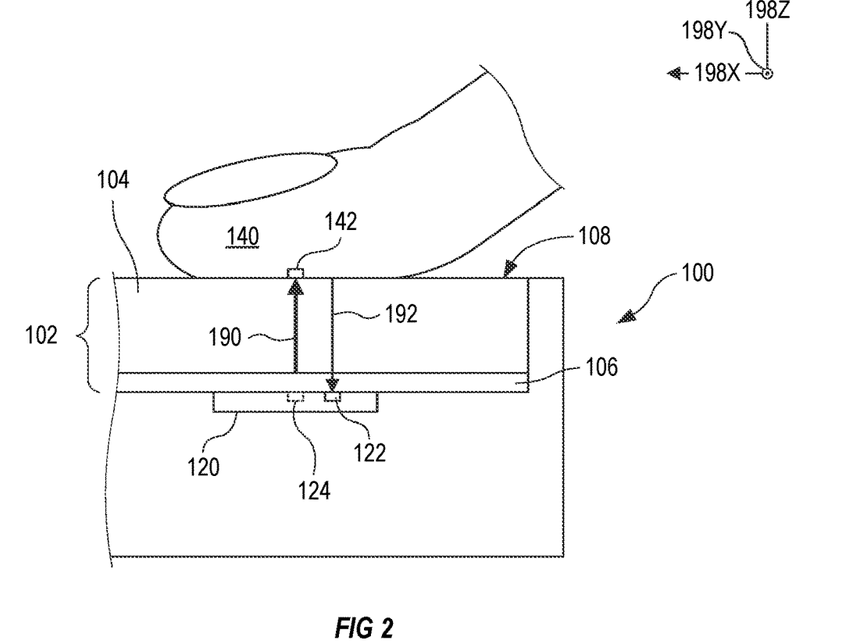
FIGS. 2 and 3 illustrate a cross-sectional side view of an optical fingerprint sensor that identifies spoof fingerprints, according to an embodiment.
Figure 3:
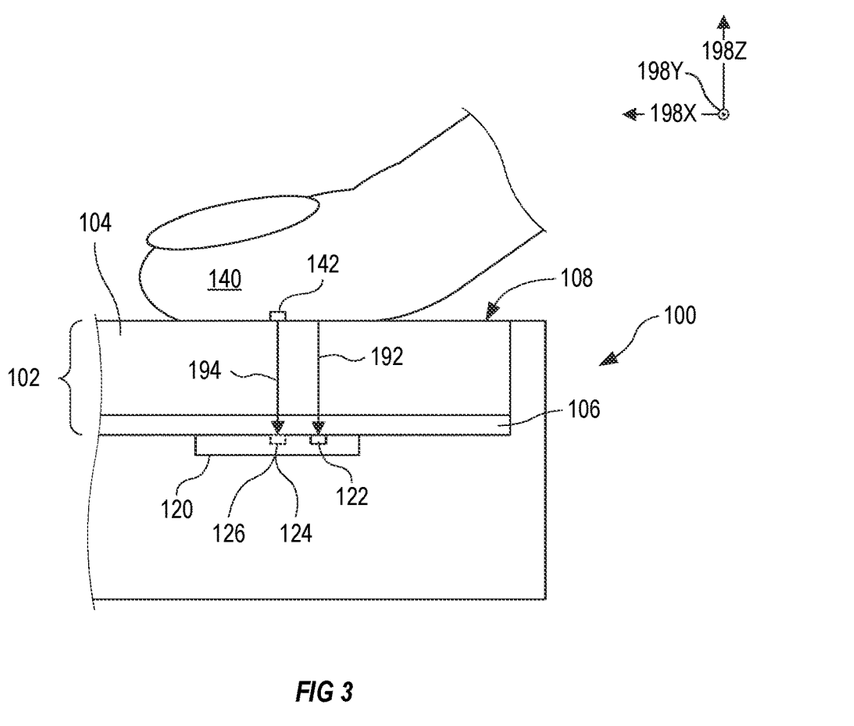

FIGS. 2 and 3 illustrate a cross-sectional side view of an electronic device 100, which includes an optical fingerprint sensor 120 that detects a first scattered signal 192 with a first optical fingerprint sensor region 122 to identify spoof fingerprints. In embodiments, the electronic device 100 is a mobile device.

Electronic device 100 includes a display 102 that includes a cover glass 104 and a light-emitting layer 106. Beneath the display 102 is the optical fingerprint sensor 120 that includes the first optical fingerprint sensor region 122 and, in embodiments, a second optical fingerprint sensor region 124. In embodiments, optical fingerprint sensor regions 122 and 124 are non-overlapping such that no pixels of optical fingerprint sensor 120 are included in both optical fingerprint sensor regions 122 and 124. Optical fingerprint sensor regions 122 and 124 may be adjacent to one another or may be separated by at least one pixel-column and/or at least one pixel-row of optical fingerprint sensor 120.

In a use scenario, a fingerprint sample 140 is disposed on a top surface 108 of the display 102. Fingerprint sample 140 includes a target region 142 that is illuminated by incident light 190 emitted from the display 102. The first scattered signal 192 propagates from the fingerprint sample 140 as described above for FIG. 1 and is detected by the first optical fingerprint sensor region 122, which is not directly beneath the target region 142. The first scattered signal 192 includes a first portion of the of the incident light 190 that is scattered by the fingerprint sample 140. Although only first scattered signal 192 is represented herein as a single line, it may represent any amount of re-transmitted light 132 as shown in FIG. 1 and may be detected in multiple areas of optical fingerprint sensor 120.

Shown in FIG. 2, optical fingerprint sensor region 122 includes fewer pixels than the full optical fingerprint sensor 120 so the time required to read-out the signals detected by first optical fingerprint sensor region 122 may be less than time required to read-out the full optical fingerprint sensor 120. The time required to acquire an anti-spoof image used to identify spoof fingerprints may be shorter than the time required to record an image of the full fingerprint 140, which is advantageous since reducing time to detect spoof fingerprints is desirable to users and manufacturers of fingerprint sensors. This is also advantageous as it reduces the power consumption required to detect signals from the optical fingerprint sensor. Reading-out the full sensor would also require more power consumption than reading-out only the smaller first optical fingerprint sensor region. In embodiments, either a portion of optical fingerprint sensor 120 or the entire optical fingerprint sensor may be read-out to acquire an anti-spoof image.

In an embodiment, the incident light 190 used to illuminate the fingerprint sample 140 is green light having a wavelength between 560 and 620 nanometers, generated by the light-emitting layer 106 of the display 102. Other colors of light may be used without departing from the scope herein.

FIG. 3 illustrates the electronic device 100 of FIG. 1 with a second scattered signal 194 detected by the second optical fingerprint sensor region 124 that overlaps a projection 126 of the target region 142 onto the optical fingerprint sensor 120. In the embodiment illustrated in FIG. 3, the first optical fingerprint sensor region 122 is offset from the projection 126 along the x axis, though the offset may be in any direction in the horizontal plane without departing from the scope hereof. The second scattered signal 194 includes a second portion of the incident light 190 (not shown in FIG. 3). In an embodiment the second scattered signal 194 is used to normalize the first scattered signal 192, which is beneficial when the intensity of the light-emitting layer 106 may be unstable, for example during a ramp-up period that may precede the recording of an image of the fingerprint sample 140. In an embodiment, the light-emitting layer is an organic light-emitting diode (OLED) that requires 20 milliseconds to produce the stable illumination required to record an image of the fingerprint sample 140. By normalizing the first scattered signal 192 to the second scattered signal 194, the process of identifying a spoof fingerprint is performed during the ramp-up period. In an embodiment, the second scattered signal 194 is used along with the first scattered signal 192 to determine the scattered light distribution (not shown) used to identify spoof fingerprints. In an embodiment of the electronic device 100 the fingerprint sample 140 is illuminated by the light emitting layer 106 that is not part of display but rather a generic light-emitting layer.

Figure 4A:
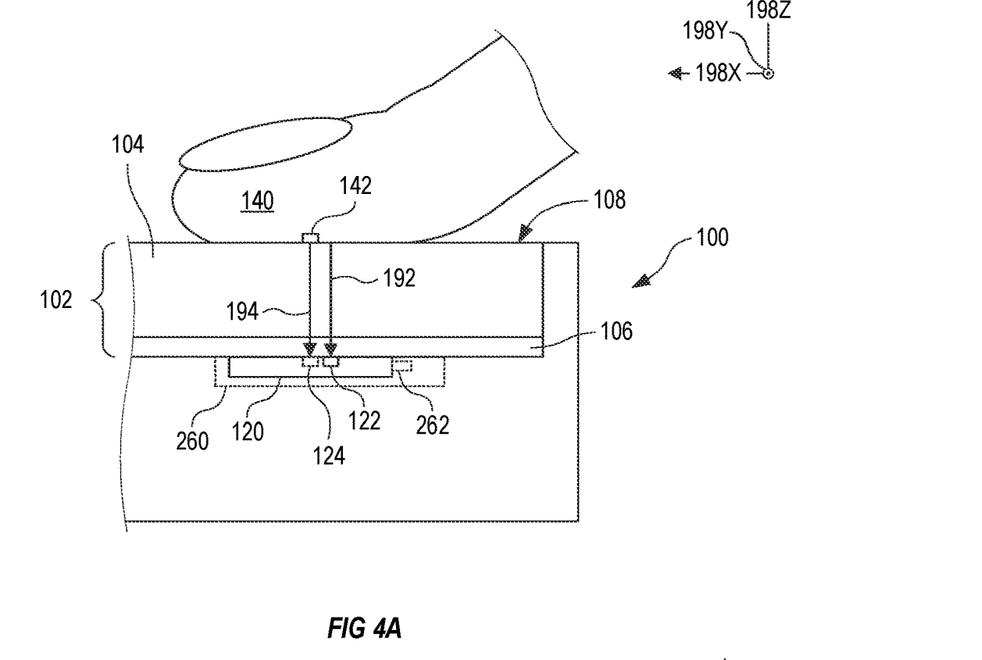
FIG. 4A illustrates a cross-sectional side view of the optical fingerprint sensor of FIGS. 2 and 3 that detects a second scattered signal with a second optical fingerprint sensor region, according to an embodiment.

FIG. 4A illustrates the electronic device 100 of FIGS. 2 and 3 with logical circuits 262 embedded on a chip 260 that includes the optical fingerprint sensor 120. The logical circuits 262 process one or more of the first scattered signal 192, the second scattered signal 194, or the scattered light distribution of re-transmitted light 132 as shown in FIG. 1. Processing any of the signals detected on the chip 260 makes it possible to detect spoof fingerprints and generate a spoof identification without additional processing power that may require integration with electronic device 100. In an embodiment this is advantageous because it is faster and more efficient that requiring interaction with a processor (not shown) of the electronic device 100. The chip 260 can directly output a signal that indicates that the fingerprint sample 140 is a spoof fingerprint and prevent subsequent actions taken by the electronic device 100 such as granting access and providing authentication. In an embodiment, the logical circuits 262 are used to normalize the first scattered signal 192 using the second scattered signal 194, as described above.

Figure 4B:
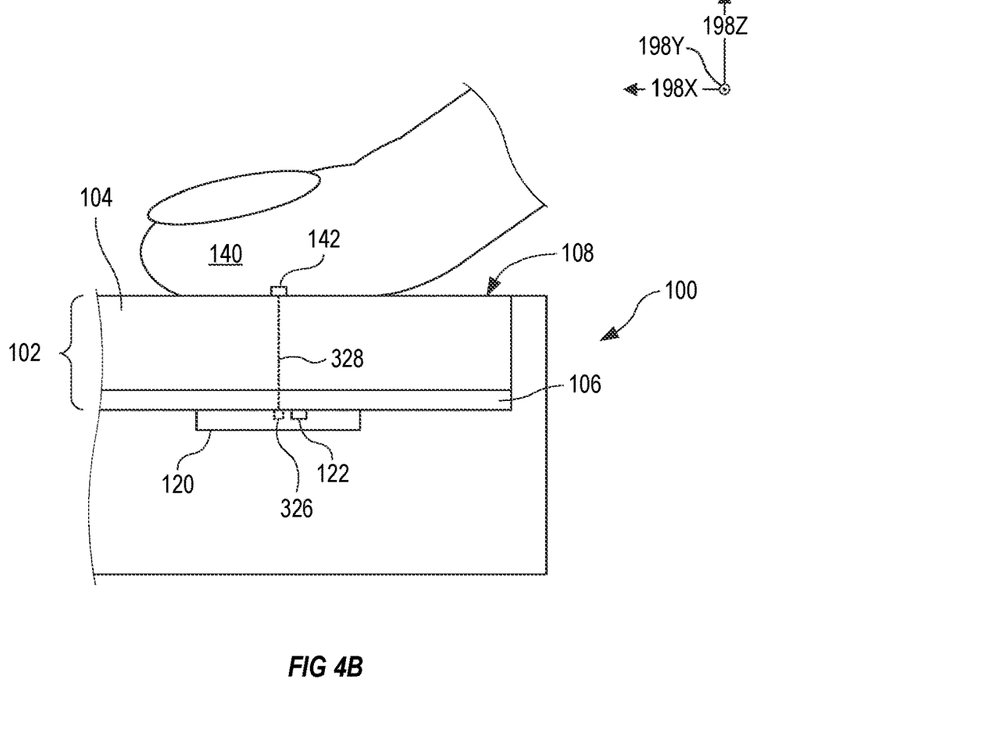
FIG. 4B illustrates a cross-sectional side view of the optical fingerprint sensor of FIGS. 2 and 3 where the target region of the fingerprint sample is aligned with the center pixel of the optical fingerprint sensor, according to an embodiment.

FIG. 4B illustrates the electronic device 100 of FIGS. 2 and 3 and illustrates a center pixel 326 of the optical fingerprint sensor 120. A surface normal 328 of the optical fingerprint sensor 120 includes the center pixel 326. In the embodiment illustrated in FIG. 4B, the target region 142 is aligned with the surface normal 328.

Figure 4C:
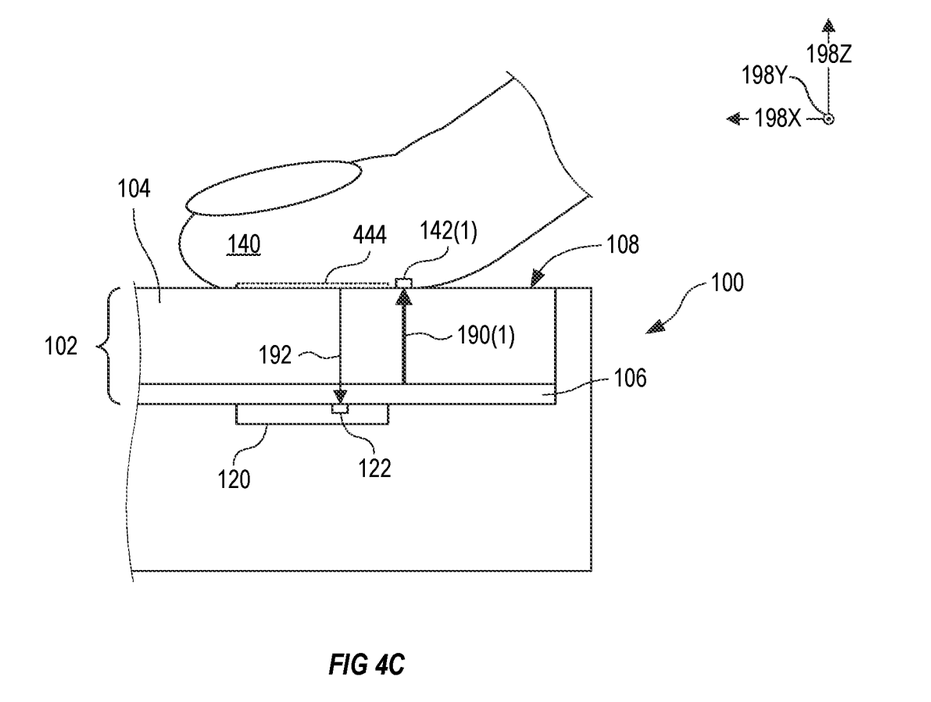
FIG. 4C illustrates a cross-sectional side view of the optical fingerprint sensor of FIGS. 2 and 3 with an additional target region of the fingerprint sample illuminated by incident light from the display, according to an embodiment.

FIG. 4C illustrates the electronic device 100 of FIGS. 2 and 3 in an embodiment where the target region 142(1) does not overlap a projection 444 of the optical fingerprint sensor 120 on the fingerprint sample 140. The incident light 190(1) from the display 102 illuminates the target region 142(1) and the first scattered sample 192 is detected by the first optical fingerprint sensor region 122.

Figure 5A:
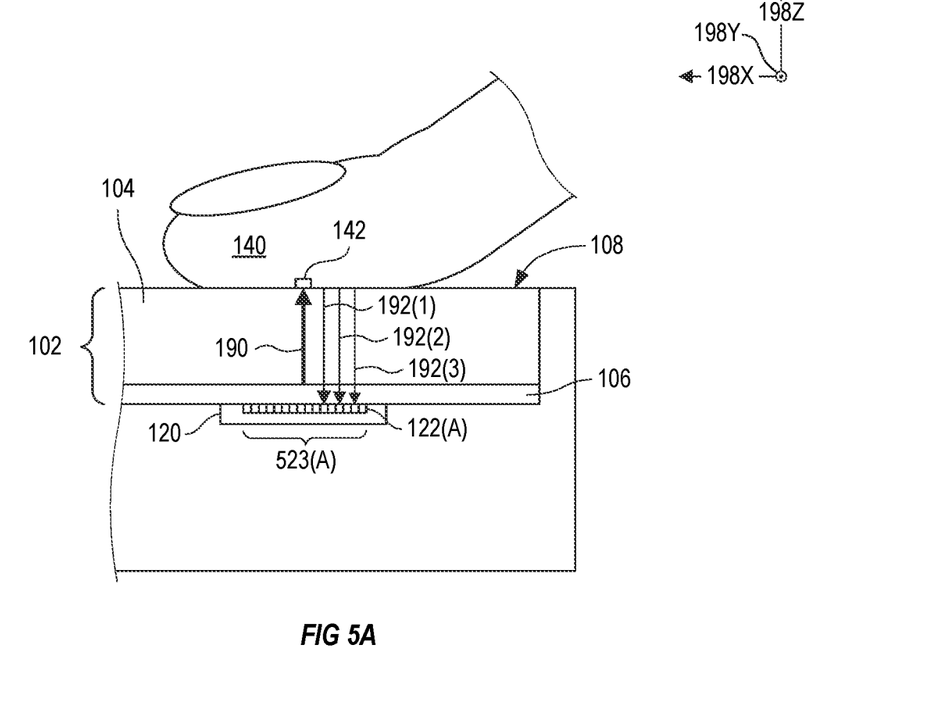
FIGS. 5A-5E illustrate a cross-sectional side view of the optical fingerprint sensor of FIGS. 2 and 3 where the first optical fingerprint sensor region includes a plurality of coplanar image-sensor sub-regions, as well as multiple optical fingerprint sensors with different optical fingerprint sensor region, according to embodiments.

FIGS. 5A, 5B, 5C, 5D, and 5E illustrate optical fingerprint sensor 120 with first optical fingerprint sensor regions 122(A), 122(B), 122(C), 122(D), and 122(E), respectively, which each include a plurality of coplanar image-sensor sub-regions 523(A), 523(B), 523(C), 523(D), and 523(E), respectively. Regions 523(A), 523(B), 523(C), 523(D), and 523(E) may be used to acquire an anti-spoof image. FIG. 5A illustrates the electronic device 100 of FIGS. 2 and 3 with the plurality of coplanar image-sensor sub-regions 523(A) adjacent to each other along the x axis. The first scattered signal 192 includes three portions of the incident light 190: 192(1), 192(2), and 192(3), each detected by one of the pluralities of coplanar image-sensor sub-regions 523(A).

Figure 5B:
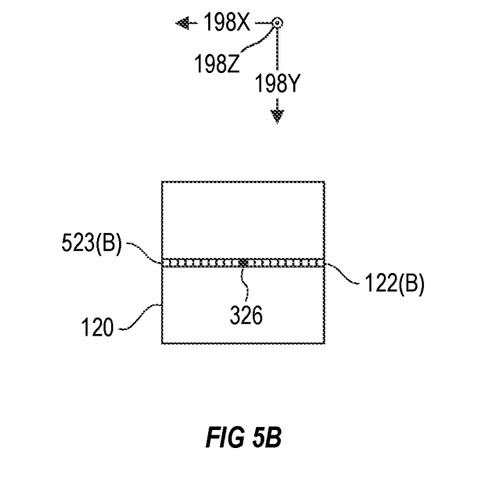

FIG. 5B illustrates the optical fingerprint sensor 120 from above, viewed along the z axis, shown with axes 198X, 198Y, and 198Z. In the embodiment illustrated in FIG. 5B, the first optical fingerprint sensor region 122(B) includes the plurality of coplanar image-sensor sub-regions 523(B), which includes the center pixel 326 of the optical fingerprint sensor 120. Although coplanar image-sensor sub-regions 523(B) are shown along axis 198X, they may also be positioned along axis 198Y, in embodiments.

Figure 5C:
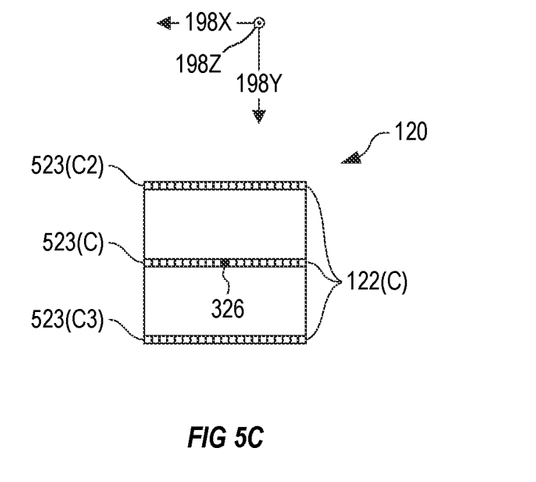

FIG. 5C illustrates the optical fingerprint sensor 120 from above, viewed along the z axis, shown with the coordinate axes 198X, 198Y, and 198Z. In the embodiment illustrated in FIG. 5C, the first optical fingerprint sensor region 122(C) includes the plurality of coplanar image-sensor sub-regions 523(C), the second plurality of coplanar image-sensor sub-regions 523(C2), and the third plurality of coplanar image-sensor sub-regions 523(C3). In the embodiment illustrated in FIG. 5C, the plurality of coplanar image-sensor sub-regions 523(C) includes the center pixel 326 of the optical fingerprint sensor 120. In an embodiment, none of the plurality of coplanar image-sensor sub-regions 523(C) includes the center pixel 326 of the optical fingerprint sensor 120. Although coplanar image-sensor sub-regions 523(C) are shown along axis 198X, they may also be positioned along axis 198Y, in embodiments.

Figure 5D:
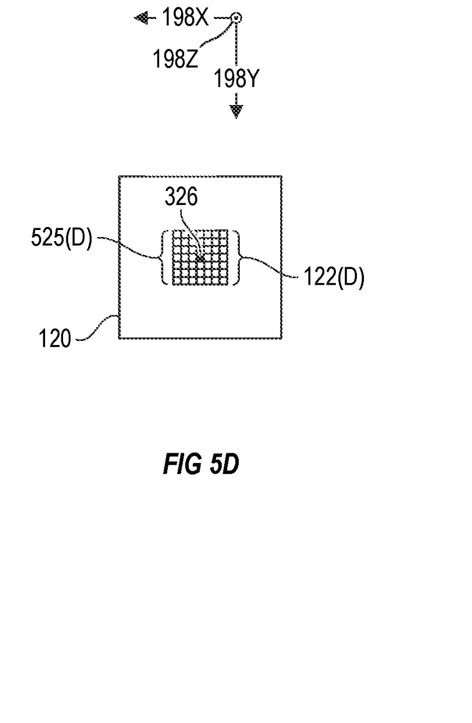

FIG. 5D illustrates the optical fingerprint sensor 120 from above, viewed along the z axis, shown with the coordinate axes 198X, 198Y, and 198Z. In the embodiment illustrated in FIG. 5D, the first optical fingerprint sensor region 122(D) includes the plurality of image-sensor sub-regions 525(D) that form a rectangle, which surrounds the center pixel 326. In an embodiment, the plurality of image-sensor sub-regions 525(D) does not surround the center pixel 326 of the optical fingerprint sensor 120.

Figure 5E:
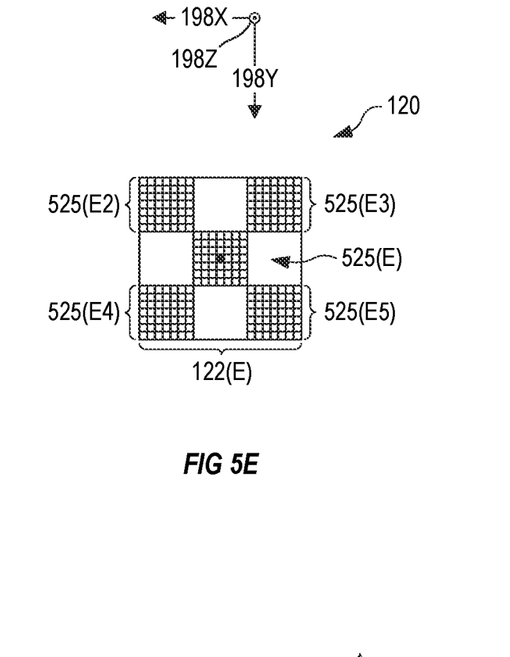

FIG. 5E illustrates the optical fingerprint sensor 120 from above, viewed along the z axis, shown with the coordinate axes 198X, 198Y, and 198Z. In the embodiment illustrated in FIG. 5E, the first optical fingerprint sensor region 122(E) includes the plurality of image-sensor sub-regions 525(E), the second plurality of image-sensor sub-regions 525(E2), the third plurality of image-sensor sub-regions 525(E3) the fourth plurality of image-sensor sub-regions 525(E4), and the fifth plurality of image-sensor sub-regions 525(E5). In the embodiment illustrated in FIG. 5E, each of the pluralities of image-sensor sub-regions (525(E), 525(E2), 525(E3), and 525(E4)) form a rectangle, though each may form a different shape without departing from the scope herein. In the embodiment illustrated in FIG. 5E, the plurality of image-sensor sub-regions 525(E) surrounds the center pixel 326 of the optical fingerprint sensor 120. In an embodiment, the plurality of image-sensor sub-regions 525(E) does not surround the center pixel 326 of the optical fingerprint sensor 120.

Although various sub-regions of optical fingerprint sensor 120 are shown in FIGS. 5A-5E, these are for purposes of illustration only and other shapes, sizes and orientations of sub-regions for acquiring an anti-spoof image by detecting first scattered signal 192 are contemplated.

Figure 6:
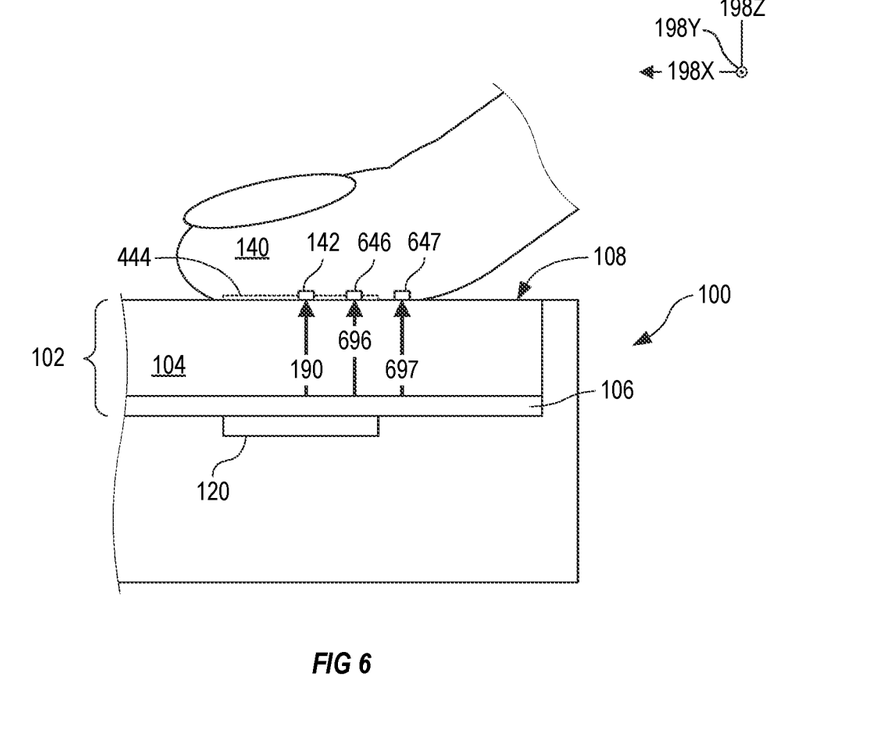
FIG. 6 illustrates a cross-sectional side view of the optical fingerprint sensor of FIGS. 2 and 3 with two additional target regions of the fingerprint sample illuminated by incident light from the display, according to an embodiment.

FIG. 6 illustrates the electronic device 100 of FIGS. 2 and 3 with additional target regions 646 and 647 of the fingerprint sample 140 illuminated by incident light 696 and 697, respectively from the display 102. Light scattered from the additional target regions 646 and 647 is used to identify spoof fingerprints in a manner similar to that described above. In the embodiment illustrated in FIG. 6, the additional target region 647 does not overlap the projection 444 of the optical fingerprint sensor 120 onto the fingerprint sample 140. The locations of target regions 646 and 647 are representative and other locations are contemplated.

Figure 7:
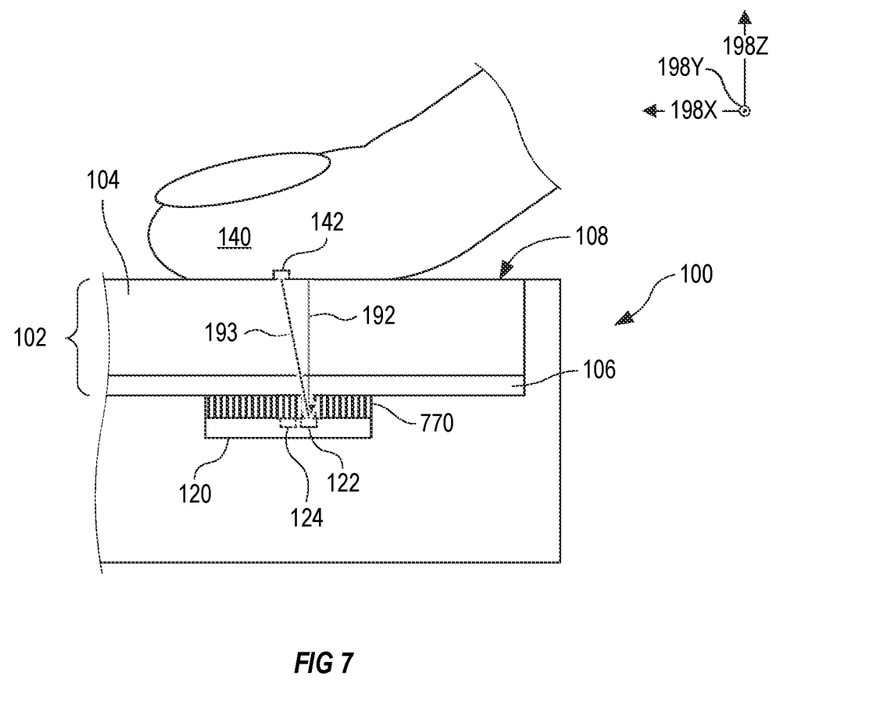
FIG. 7 illustrates a cross-sectional side view of the optical fingerprint sensor of FIGS. 2 and 3 with a collimator between the display and the optical fingerprint sensor that blocks scattered light from reaching the optical fingerprint sensor depending on incident angle.

FIG. 7 illustrates the electronic device 100 of FIGS. 2 and 3 with a collimator 770 between the display 102 and the optical fingerprint sensor 120. First scattered signal 192 must pass through the collimator 770 to be detected by the first optical fingerprint sensor region 122. Light incident on the collimator 770 is prevented from reaching the optical fingerprint sensor 120 based upon its angle of incidence. Incoming light with angle of incidence larger than a threshold angle is blocked, while light with angle of incidence smaller than the threshold angle is permitted to be detected by the optical fingerprint sensor 120. In an embodiment, collimator 770 includes a plurality of lenses and a plurality of apertured baffle-layers that establish the threshold, forming an acceptance angle of the collimator 770. The combined effect of the optical fingerprint sensor 120 and collimator 770 is to spatially map incoming light to the region of the fingerprint sample 140 from which the light was scattered. This provides a beneficial advantage when combined with the method for identifying spoof fingerprints described herein. Light 193 scattered from the target region 142 is blocked by the collimator 770 because it does not fall within the acceptance angle of the collimator 770. This increases the signal-to-noise ratio of the first optical fingerprint sensor region 122, which detects portions of incident light 190 that scatter from the fingerprint sample 140 from locations not directly illuminated by incident light. Instead, the light detected at the first optical fingerprint sensor region 122 was scattered from fingerprint sample at a position a distance away from the target region 142.

Figure 8:
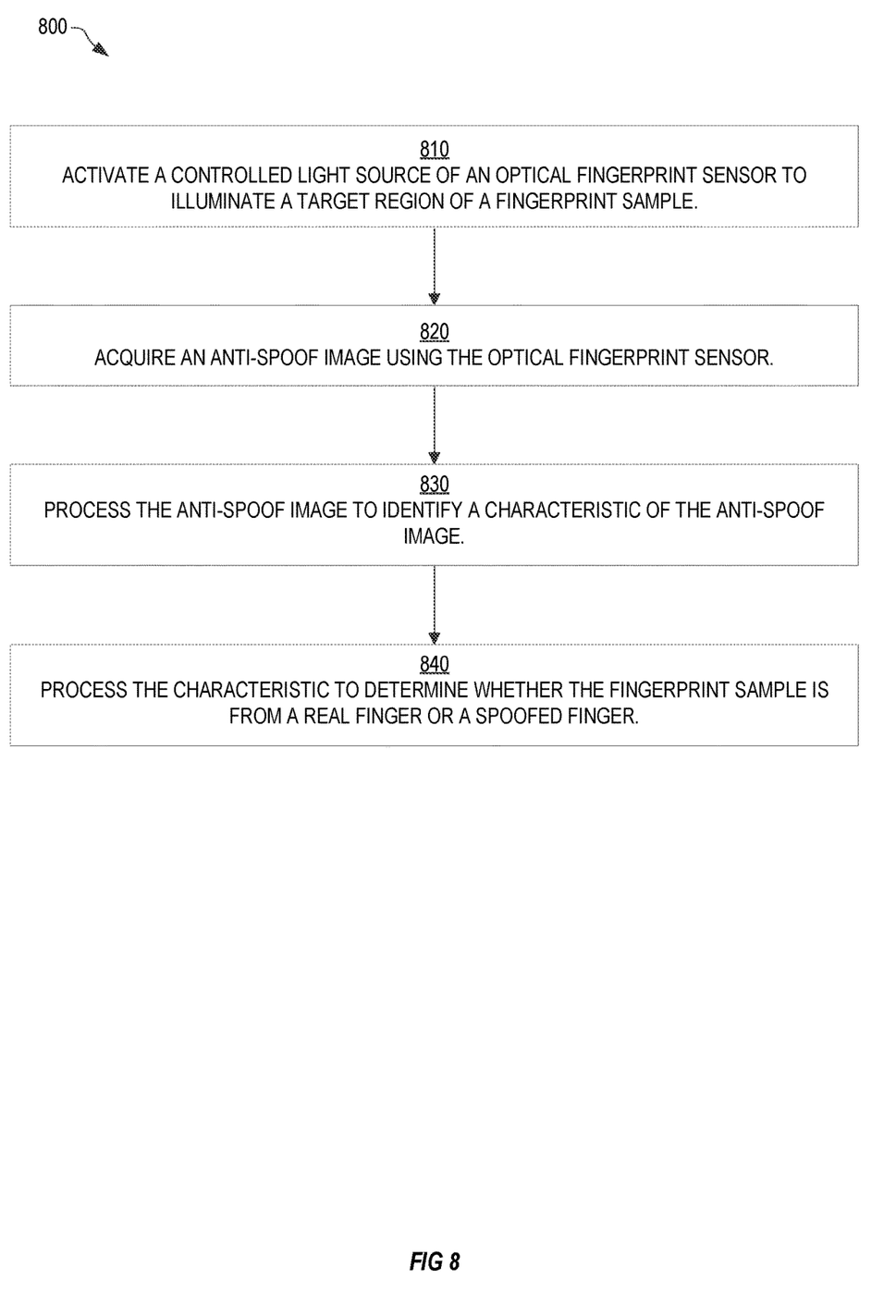
FIG. 8 is a flowchart illustrating a method for identifying spoof fingerprints using an optical fingerprint sensor, according to embodiments.

FIG. 8 is a flowchart illustrating a method 800 for identifying spoof fingerprint samples with an optical fingerprint sensor with a controlled light source, according to an embodiment. Method 800 may be implemented by any one of the mobile devices of FIG. 2, 3, 4A, 4B, 4C, 5A, 5B, 5C, 5D, 5E, 6, or 7.

In block 810, the controlled light source is activated to illuminate a target region of a fingerprint sample. In an example of block 810, the target region 142 is illuminated by incident light 190 from the light-emitting layer 106 of the display 102. Target region 142 is less than a total image area of optical fingerprint sensor 120.

In block 820, an anti-spoof image is acquired using the optical fingerprint sensor. In an example of block 820, the first scattered signal 192 from the fingerprint sample 140 is detected by the first optical fingerprint sensor region 122 of the optical fingerprint sensor 120 that is beneath the display 102. The first optical fingerprint sensor region 122 is not directly beneath the target region 142 but is instead offset from the projection 126 of the target region 142 onto the optical fingerprint sensor 120. In embodiments, the first scattered signal 192 may also include a first portion of the incident light scattered by the target region.

In block 830, the anti-spoof image is processed to identify a characteristic of the anti-spoof image. In an example of block 840, the characteristic includes an intensity of first scattered signal 192.

In block 840, the characteristic is processed to determine whether the fingerprint sample is from a real finger or a spoofed finger. In an example of block 840, the characteristic includes an intensity, pattern or scattered light distribution that is different for a real finger and a spoofed finger.

Figure 9:
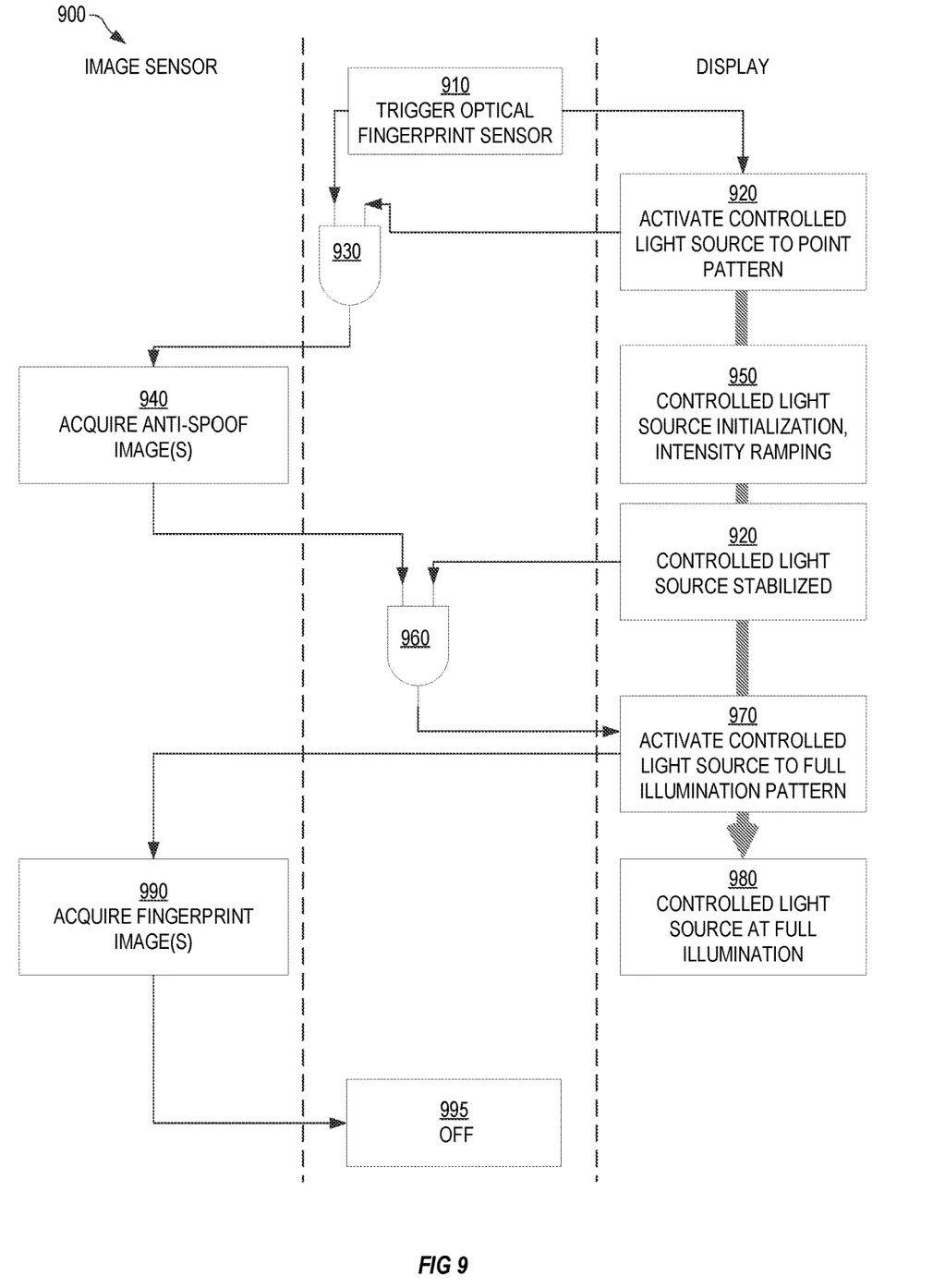
FIG. 9 is a flowchart illustrating the method of FIG. 8 for identifying spoof fingerprints using an optical fingerprint sensor, according to an embodiment.

FIG. 9 is a flowchart illustrating a method 900 for identifying spoof fingerprints with an optical fingerprint sensor, according to an embodiment. Method 900 may be implemented by any one of the mobile devices of FIG. 2, 3, 4A, 4B, 4C, 5A, 5B, 5C, 5D, 5E, 6, or 7. Method 900 illustrates a method of acquiring anti-spoof images using an optical fingerprint sensor that is positioned under a display of an electronic device where the display is used as a controlled light source. As shown in FIG. 9, method 900 captures anti-spoof images during a display "ramp" period. Although method 900 illustrates principles described herein, anti-spoof images may be acquired before or after a full fingerprint image is acquired as long as the illumination pattern is different. Further, other embodiments, may use different light sources and configurations of hardware.

In block 910, an optical fingerprint sensor is triggered to turn on. In an example of block 910, optical fingerprint sensor 120 is triggered by a user placing a fingerprint sample 140 on top surface 108 of display 102.

In block 920, a controlled light source is activated to illuminate a target region. In an example of block 920, display 106 is activated to produce a point pattern that may include a single point of light or multiple points of light that illuminate target region 142 of fingerprint sample 140. In embodiments, target region 142 is less than a total image area of optical fingerprint sensor 120.

In blocks 930 and 940, when both the optical fingerprint sensor is triggered and the controlled light source are activated, an anti-spoof image is acquired. In an example of blocks 930 and 940, logic circuits 262, for example, cause optical fingerprint sensor 120 to acquire an anti-spoof image by reading out pixels of optical fingerprint sensor 120. One, multiple or all pixels may be read out as explained in connection with FIGS. 5A-5E. Once acquired, an anti-spoof image is processed to identify a characteristic indicative of whether fingerprint sample 140 is provided by a real finger or a spoofed finger. In embodiments, the characteristic is processed by a matching algorithm or a machine learning algorithm.

In block 950, a controlled light source is initialized. In an example of block 950, the controlled light source is an OLED display that requires tens of milliseconds to stabilize before a full fingerprint image may be acquired. During this intensity ramping period, the anti-spoof image or images may be acquired in block 940.

In blocks 960-990, when both the anti-spoof image(s) and the controlled light source are stabilized, the controlled light source is activated to full illumination. In an example of blocks 960 and 970, logic circuits 262, for example, activate controlled light source. In blocks 980 and 990, as controlled light source reaches full illumination, optical fingerprint sensor 120 acquires a fingerprint image by reading out pixels of optical fingerprint sensor 120.

In block 990, when both images are acquired, the optical fingerprint sensor is turned off.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

COMBINATION OF FEATURES (A1) In a first aspect, a method for detecting spoof fingerprints using an optical fingerprint sensor with a controlled light source includes activating the controlled light source to illuminate a target region of a fingerprint sample, wherein the target region is a less than a total image area of the optical fingerprint sensor; acquiring an anti-spoof image using the optical fingerprint sensor while the controlled light source illuminates the target region; processing the anti-spoof image to identify a characteristic of the anti-spoof image; and processing the characteristic to determine whether the fingerprint sample is from a real finger or a spoofed finger.

(A2) In an embodiment of A1, wherein the characteristic of the anti-spoof image further comprises a characteristic of light from the light source that is re-transmitted by the fingerprint sample.

(A3) In an embodiment of either A1 or A2, wherein the characteristic further comprises a pattern or scattered light distribution that is different for the real finger and the spoofed finger.

(A4) In an embodiment of any of A1 through A3, wherein the steps of activating the controlled light source and acquiring the anti-spoof image occur during a ramp-up period of the controlled light source.

(A5) In an embodiment of any of A1 through A4, wherein the target region is aligned with a center pixel of the optical fingerprint sensor.

(A6) In an embodiment of any of A1 through A5, wherein the target region does not overlap a projection of the optical fingerprint sensor onto the fingerprint sample.

(A7) In an embodiment of any of A1 through A6, wherein the target region further comprises a pattern of illumination.

(A8) In an embodiment of any of A1 through A7, wherein the controlled light source is controlled to produce different colors of light.

(A9) In an embodiment of any of A1 through A8, wherein the optical fingerprint sensor comprises a plurality of pixels, and the anti-spoof image is acquired using a sub-region of the plurality of pixels.

(A10) In an embodiment of A9, wherein the sub-region of the plurality of pixels further comprises a center pixel of the optical fingerprint sensor.

(A11) In an embodiment of A9, wherein the sub-region of the plurality of pixels further comprises one or more pixel-rows or pixel-columns.

(A12) In an embodiment of A9, wherein the sub-region of the plurality of pixels further comprises one or more rectangular areas of pixels.

(A13) In an embodiment of any of A1 through A12, wherein using the characteristic to determine whether the fingerprint sample is a real finger or a spoofed finger further comprises one or more of (a) a matching algorithm and (b) a machine learning algorithm.

(A14) In an embodiment of any of A1 through A13, further comprising collimating light scattered from the fingerprint sample with a collimator positioned above the optical fingerprint sensor.

(B1) In a second aspect, an optical fingerprint sensor for detecting spoof fingerprints includes an image sensor comprising an array of pixels for capturing a total image area; a controlled light source controllable to illuminate the total image area and a target region that is less than the total image area; logic circuits for controlling the image sensor to: acquire an anti-spoof image when the controlled light source illuminates the target region, process the anti-spoof image to identify a characteristic of the anti-spoof image and process the characteristic to determine whether the fingerprint sample is a real finger or a spoofed finger; and acquire an image of a fingerprint sample when the controlled light source illuminates the total image area.

(B2) In an embodiment B1, wherein the controlled light source is an OLED (organic light-emitting diode) display.

(B3) In an embodiment of either B1 or B2, wherein the OLED display is between the image sensor and the fingerprint sample.

(B4) In an embodiment of any of B1 through B3, wherein the anti-spoof image is acquired during a ramp time of the OLED display.

(B5) In an embodiment of any of B1 through B4, wherein the characteristic of the anti-spoof image further comprises a pattern or scattered light distribution that is different for the real finger and the spoofed finger.

What is claimed is:

1. A method for detecting spoof fingerprints using an optical fingerprint sensor with a controlled light source, comprising:
    activating the controlled light source during a ramp-up period of the controlled light source to illuminate a target region of a fingerprint sample, wherein the target region is a less than a total image area of the optical fingerprint sensor;
    acquiring an anti-spoof image using the optical fingerprint sensor while the controlled light source illuminates the target region;
    processing the anti-spoof image to identify a characteristic of the anti-spoof image; and
    processing the characteristic to determine whether the fingerprint sample is from a real finger or a spoofed finger.

2. The method of claim 1, wherein the characteristic of the anti-spoof image further comprises a characteristic of light from the light source that is re-transmitted by the fingerprint sample.

3. The method of claim 2, wherein the characteristic further comprises a pattern or scattered light distribution that is different for the real finger and the spoofed finger.

4. The method of claim 1, wherein the target region is aligned with a center pixel of the optical fingerprint sensor.

5. The method of claim 1, wherein the target region does not overlap a projection of the optical fingerprint sensor onto the fingerprint sample.

6. The method of claim 1, wherein the target region further comprises a pattern of illumination.

7. The method of claim 1, wherein the controlled light source is controlled to produce different colors of light.

8. The method of claim 1, wherein the optical fingerprint sensor comprises a plurality of pixels, and the anti-spoof image is acquired using a sub-region of the plurality of pixels.

9. The method of claim 8, wherein the sub-region of the plurality of pixels further comprises a center pixel of the optical fingerprint sensor.

10. The method of claim 8, wherein the sub-region of the plurality of pixels further comprises one or more pixel-rows or pixel-columns.

11. The method of claim 8, wherein the sub-region of the plurality of pixels further comprises one or more rectangular areas of pixels.

12. The method of claim 1, wherein using the characteristic to determine whether the fingerprint sample is a real finger or a spoofed finger further comprises one or more of (a) a matching algorithm and (b) a machine learning algorithm.

13. The method of claim 1, further comprising collimating light scattered from the fingerprint sample with a collimator positioned above the optical fingerprint sensor.

14. An optical fingerprint sensor for detecting spoof fingerprints, comprising:
    an image sensor comprising an array of pixels for capturing a total image area;
    a controlled light source controllable to illuminate the total image area and a target region that is less than the total image area;
    logic circuits for controlling the image sensor to:
        acquire an anti-spoof image when the controlled light source illuminates the target region, process the anti-spoof image to identify a characteristic of the anti-spoof image and process the characteristic to determine whether the fingerprint sample is a real finger or a spoofed finger; and
        acquire an image of a fingerprint sample when the controlled light source illuminates the total image area;
    wherein the anti-spoof image is acquired during a ramp time of the OLED display.

15. The optical fingerprint sensor of claim 14, wherein the controlled light source is an OLED (organic light-emitting diode) display.

16. The optical fingerprint sensor of claim 15, wherein the OLED display is between the image sensor and the fingerprint sample.

17. The optical fingerprint sensor of claim 14, wherein the characteristic of the anti-spoof image further comprises a pattern or scattered light distribution that is different for the real finger and the spoofed finger.

* * * * *